United States Patent
Wen

(10) Patent No.: US 10,189,537 B2
(45) Date of Patent: Jan. 29, 2019

(54) BRAKE FOR BICYCLE

(71) Applicant: Yuan-Hung Wen, Chang Hua County (TW)

(72) Inventor: Yuan-Hung Wen, Chang Hua County (TW)

(*) Notice: Subject to any disclaimer, the term of this patent is extended or adjusted under 35 U.S.C. 154(b) by 0 days.

(21) Appl. No.: 15/797,451

(22) Filed: Oct. 30, 2017

(65) Prior Publication Data

US 2018/0043964 A1 Feb. 15, 2018

Related U.S. Application Data

(63) Continuation-in-part of application No. 14/992,293, filed on Jan. 11, 2016, now abandoned.

(30) Foreign Application Priority Data

Mar. 24, 2015 (TW) .............................. 104109391 A

(51) Int. Cl.
*B62L 3/00* (2006.01)
*B62L 1/16* (2006.01)

(52) U.S. Cl.
CPC ...................................... *B62L 1/16* (2013.01)

(58) Field of Classification Search
CPC ........... B62L 1/14; B62L 3/00; F16D 2125/36
USPC ...................................................... 188/24.22
See application file for complete search history.

(56) References Cited

U.S. PATENT DOCUMENTS

| | | | |
|---|---|---|---|
| 3,314,504 A | 4/1967 | Altenburger | |
| 4,014,408 A | 3/1977 | Armstrong | |
| 4,015,690 A | 4/1977 | Armstrong | |
| 4,290,507 A | 9/1981 | Brown | |
| 4,391,352 A | 7/1983 | Brown | |
| 5,425,434 A | 6/1995 | Romano | |
| 6,302,242 B1* | 10/2001 | Mao | B62L 3/00 188/24.21 |
| 7,422,090 B1* | 9/2008 | Preuss | B60T 1/06 188/24.12 |
| 7,537,094 B1 | 5/2009 | Kato | |
| 8,151,945 B2 | 4/2012 | Tsai | |
| 8,485,320 B2 | 7/2013 | Jordan | |
| 8,517,151 B2* | 8/2013 | Wehage | B62L 1/16 188/24.12 |
| 8,997,943 B2 | 4/2015 | Nago et al. | |
| 9,233,731 B1 | 1/2016 | Nago | |

(Continued)

*Primary Examiner* — Bradley T King
*Assistant Examiner* — Mahbubur Rashid
(74) *Attorney, Agent, or Firm* — Muncy, Geissler, Olds & Lowe, P.C.

(57) ABSTRACT

A brake for a bicycle includes a base, first and second arm assemblies. The first and second arm assemblies are pivoted to the base. The first arm assembly has a first end portion, for connection of a brake line a second end portion for frictionally contacting a brake side of a wheel rim. The second arm assembly is pivoted to the base and corresponds to the first arm assembly. The second arm assembly has a third end portion, a fourth end portion and a second abutting portion which is arranged on the third end portion. The second abutting portion is located correspondingly above the first abutting portion and interferable with the first abutting portion in a pivoting direction of the first abutting portion. The fourth end portion is swingable toward the brake side to clip the other brake side of the wheel rim.

11 Claims, 5 Drawing Sheets

(56) References Cited

U.S. PATENT DOCUMENTS

| | | | |
|---|---|---|---|
| 9,272,749 B1* | 3/2016 | Wu | B62L 1/14 |
| 2004/0074704 A1 | 4/2004 | Ciamillo | |
| 2006/0113151 A1* | 6/2006 | Tsai | B62L 1/14 |
| | | | 188/24.12 |
| 2008/0202866 A1* | 8/2008 | Caiazzo | B62L 1/12 |
| | | | 188/24.12 |
| 2009/0038894 A1 | 2/2009 | Liu et al. | |
| 2009/0078512 A1* | 3/2009 | Edwards | B62L 1/16 |
| | | | 188/24.12 |
| 2010/0230215 A1 | 9/2010 | Ginster | |
| 2011/0290594 A1 | 12/2011 | Tsai | |
| 2012/0067675 A1 | 3/2012 | Thrash | |
| 2012/0248732 A1* | 10/2012 | Watarai | B62L 1/14 |
| | | | 280/259 |
| 2013/0009380 A1 | 1/2013 | Servet | |
| 2013/0187358 A1 | 7/2013 | Kohl et al. | |
| 2014/0190775 A1 | 7/2014 | Short et al. | |
| 2014/0262631 A1* | 9/2014 | Cobb | B62L 1/16 |
| | | | 188/24.21 |
| 2016/0068220 A1* | 3/2016 | Conner | B62L 1/16 |
| | | | 188/24.19 |

* cited by examiner

BRAKE FOR BICYCLE

This application is a Continuation-in-Part of application Ser. No. 14/992,293, filed on Jan. 11, 2016, for which priority is claimed under 35 U.S.C. § 120; and this application claims priority of Application No. 104109391 filed in Taiwan on Mar. 24, 2015 under 35 U.S.C. § 119, the entire contents of all of which are hereby incorporated by reference.

BACKGROUND OF THE INVENTION

Field of the Invention

Description of the Prior Art

Recently, riding a bicycle has become a fad, and bicycle racings are often held; therefore, how to allow a cyclist to ride a bicycle faster is one of the features that the bicycle manufacturers want to improve. In addition, another feature to be improved is a brake system of the bicycle because the brake system has a direct influence on the safety of the cyclist. Conventionally, a brake for a bicycle has two arm assemblies corresponding to each other. One of the arm assemblies is driven by a brake line to swing toward a brake side of a wheel rim, and then, the other arm assembly is driven to swing toward the other brake side of the wheel rim so that the two arm assemblies can brake the wheel rim.

However, in this type of prior art, the two arm assemblies of the brake cannot swing synchronously to clip the wheel rim; that is, two brake sides of the wheel rim are not applied with brake at the same time, so the two brake sides receive forces in different intensities. Therefore, the cyclist cannot brake the bicycle effectively, a brake member on one said brake side, which receives greater force, is abraded overly, and the brake function is influenced.

U.S. Pat. No. 3,314,504 discloses that the base is fixedly connected to a frame of the bicycle; however, the cable adjuster (channeled portion) is fixedly disposed on the first arm assembly. That is, the cable adjuster (channeled portion) and the first arm assembly move synchronously, and the cable adjuster (channeled portion) is not always at a fixed position. Like all conventional structures, the first arm assembly will contact the brake face first, and the second arm assembly then contacts another brake face, such that the first arm assembly and the second arm assembly do not contact the brake faces synchronously. As a result, the brake reaction time is prolonged, and each braking member will be abraded on single side, and the braking effect is poor.

The present invention is, therefore, arisen to obviate or at least mitigate the above-mentioned disadvantages.

SUMMARY OF THE INVENTION

The main object of the present invention is to provide a brake for a bicycle, wherein when a brake line is driven to move, two arm assemblies swing synchronously to frictionally contact a wheel rim; therefore, a brake reaction time decreases, and brake members on two sides of the wheel rim receive forces evenly so as to brake effectively.

To achieve the above and other objects, a brake for a bicycle is provided, including a base, a first arm assembly and a second arm assembly. The base is for fixedly connected to a frame of the bicycle. The first arm assembly is pivoted to the base, and the first arm assembly has a first end portion, a second end portion and a first abutting portion. The first end portion is for connection of a brake line, and the second end portion is swingable toward a first brake side of a wheel rim to frictionally contact the first brake side. The second arm assembly is pivoted to the base and corresponds to the first arm assembly, and the second arm assembly has a third end portion, a fourth end portion and a second abutting portion arranged on the third end portion. The second abutting portion is located correspondingly above the first abutting portion and interferable with the first abutting portion in a pivoting direction of the first abutting portion. The fourth end portion is swingable toward a second brake side of the wheel rim to frictionally contact the second brake side of the wheel rim.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
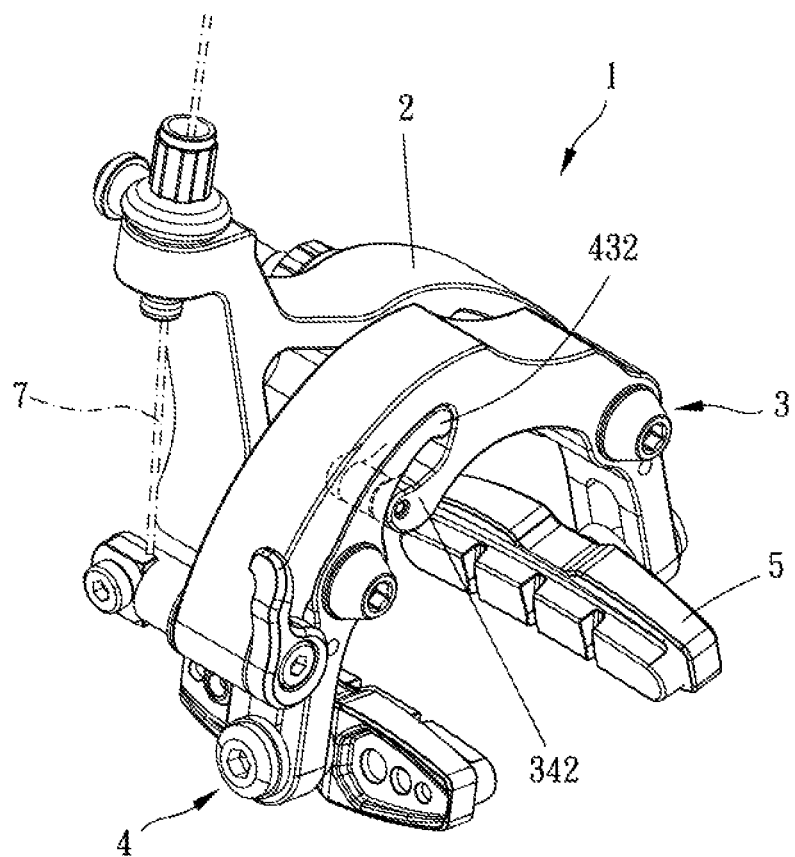
FIG. 1 is a perspective drawing of a preferred embodiment of the present invention.
Figure 2:
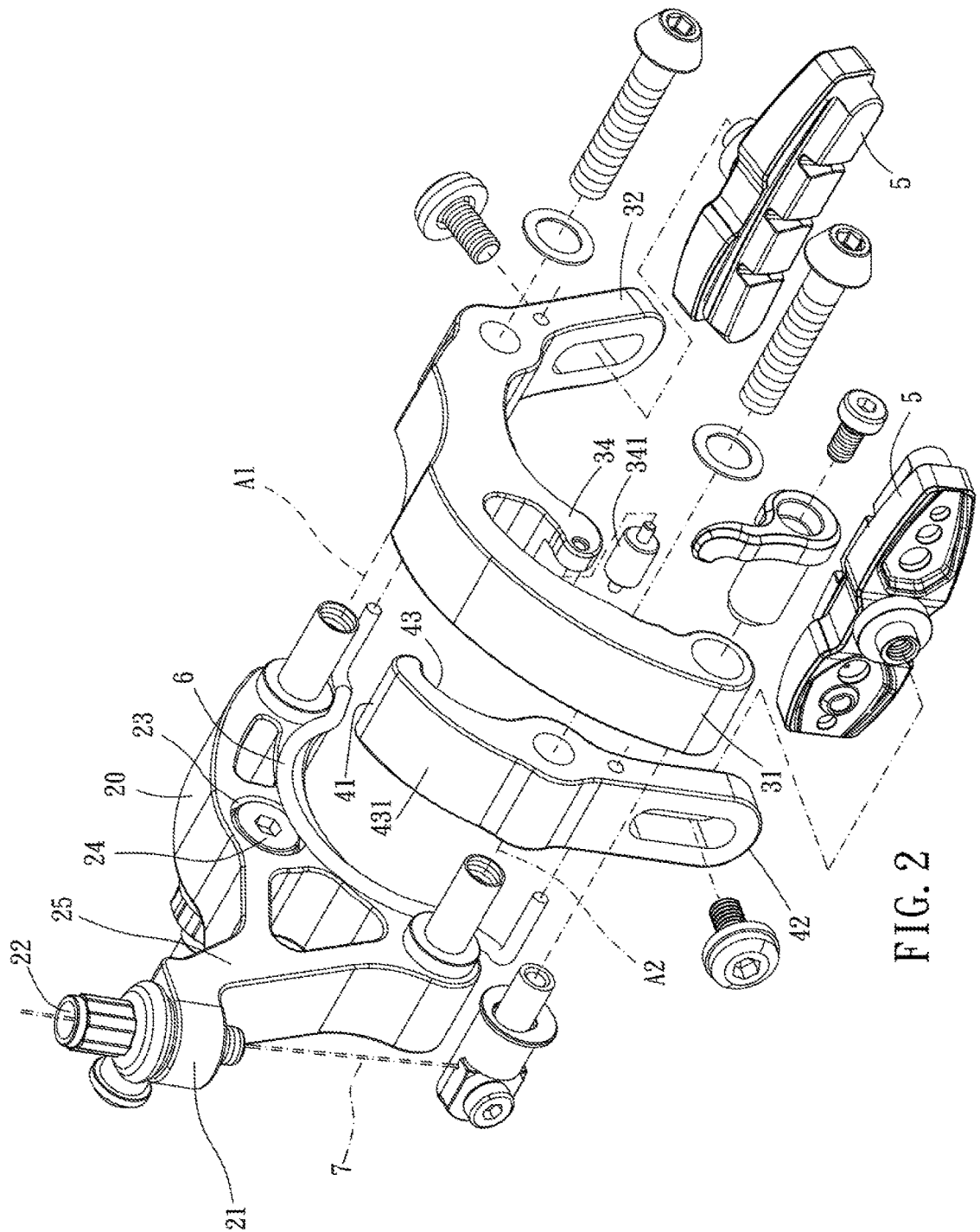
FIG. 2 is a breakdown drawing of the preferred embodiment of the present invention.
Figure 3:
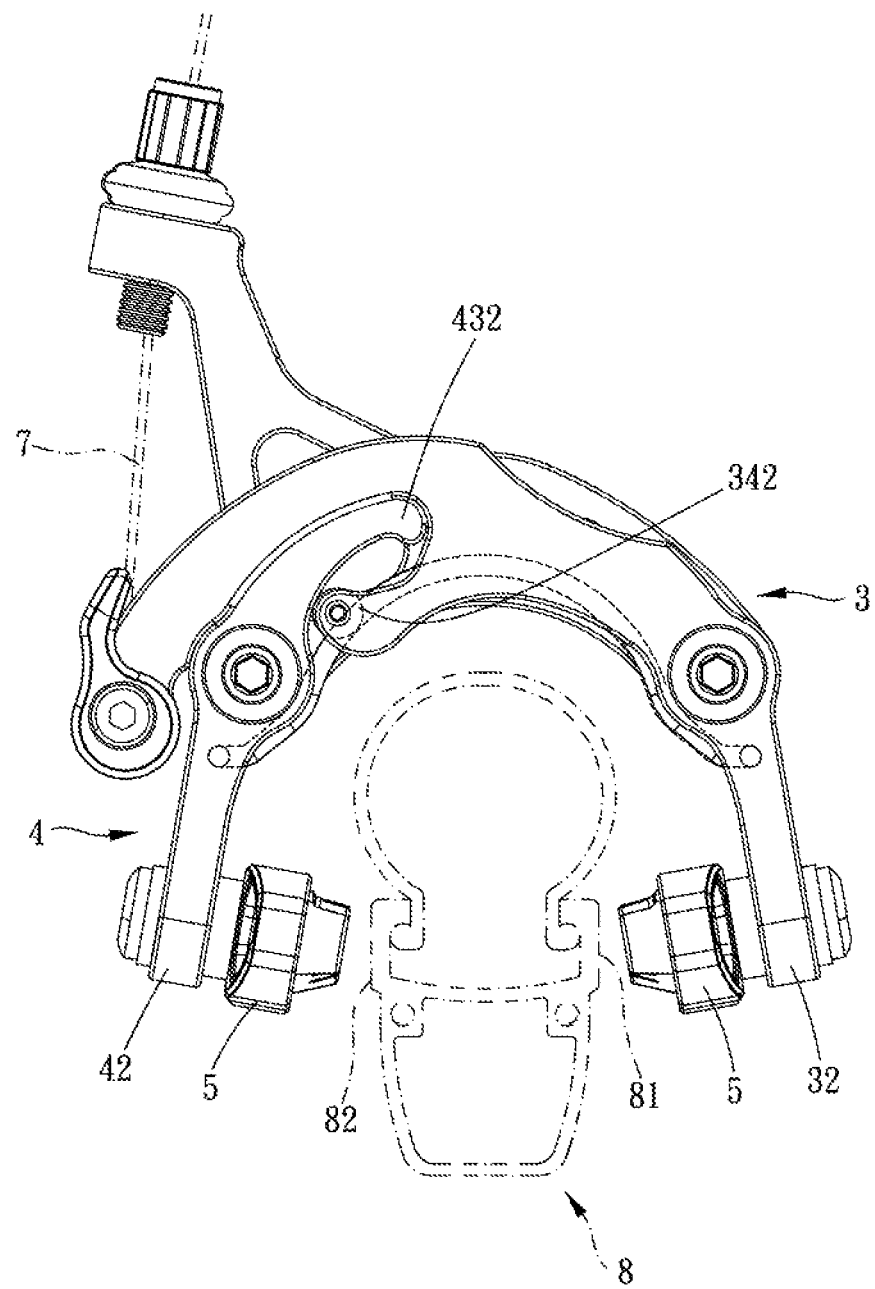
FIGS. 3 and 4 are drawings showing the preferred embodiment of the present invention in use.
Figure 4:
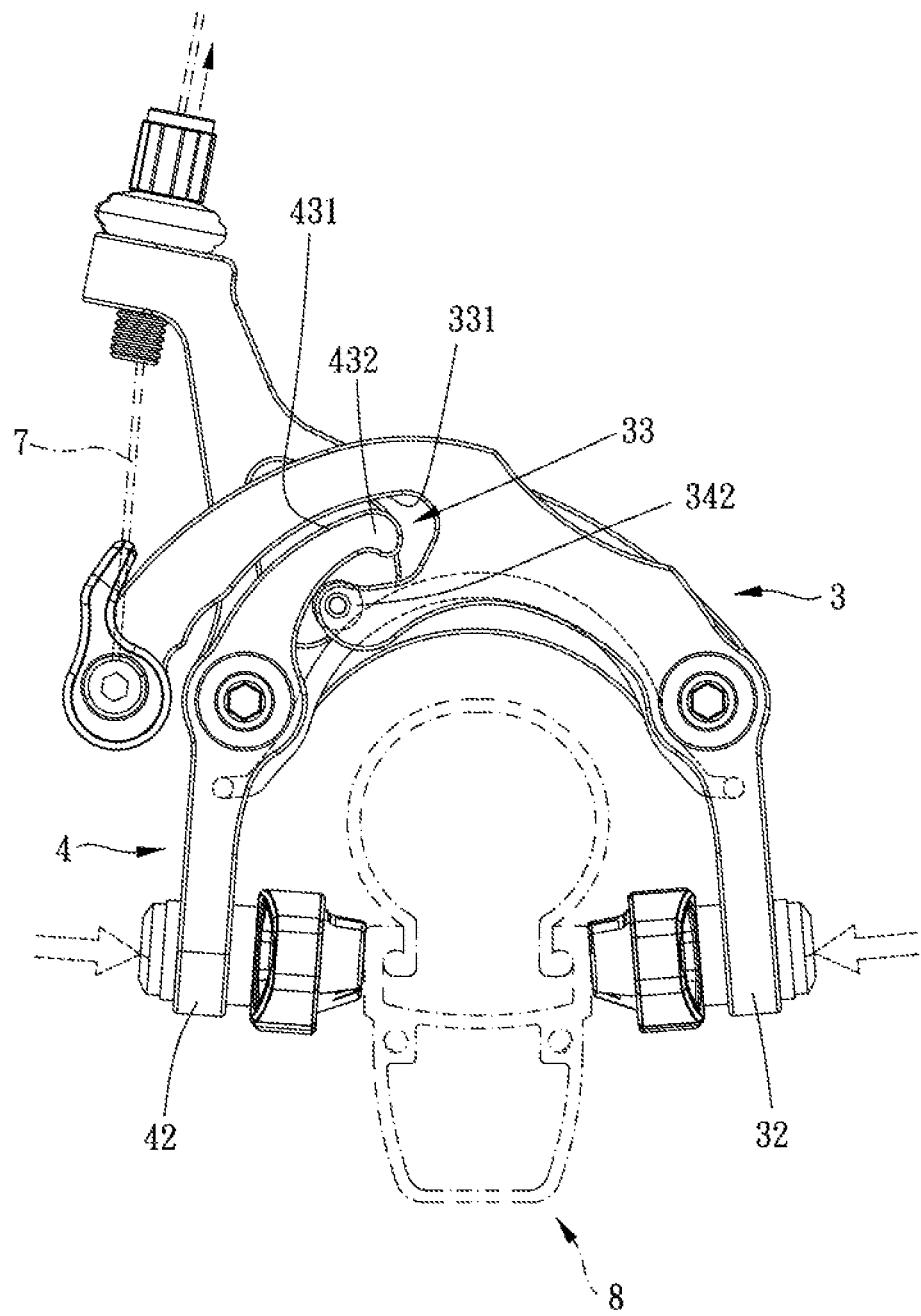

Please refer to FIGS. 1 to 4 for a preferred embodiment of the present invention. A brake 1 for a bicycle includes a base 2, a first arm assembly 3 and a second arm assembly 4.

The base 2 is for being fixedly connected to a frame (not shown) of a bicycle. The first arm assembly 3 is pivoted to the base 2, the first arm assembly 3 has a first end portion 31, a second end portion 32 and a first abutting portion 34, the first end portion 31 is for connection of a brake line 7, and the second end portion 32 is swingable toward a first brake side 81 of a wheel rim 8 to frictionally contact the first brake side 81. The second arm assembly 4 is pivoted to the base 2 and corresponds to the first arm assembly 3, and the second arm assembly 4 has a third end portion 41, a fourth end portion 42 and a second abutting portion 43 arranged on the third end portion 41. The second abutting portion 43 is located correspondingly above the first abutting portion 34 and interferable with the first abutting portion 34 in a pivoting direction of the first abutting portion 34. The fourth end portion 42 is swingable toward a second brake side 82 of the wheel rim 8 to frictionally contact the second brake side 82 of the wheel rim 8.

The base 2 is fixedly disposed on the frame of the bicycle, so as long as the brake line 7 is connected to the first end portion 31, the brake 1 for the bicycle can be driven. The base 2 includes a rigid main body 20 configured for being rigidly fixed to the frame of the bicycle and a channeled portion 21 fixedly connected with the rigid main body 20 and having a through hole 22 configured for the brake line 7 to be slidably disposed therethrough, the channeled portion 21 is configured to be in a fixed position relative to the frame of the bicycle, and the channeled portion 21 is at a fixed position relative the rigid main body 20 when the brake line is operated or pulled. That is, the channeled portion 21 is always at a fixed position no matter whether the brake line is operated or pulled or not. The channeled portion 21 is preferably integrally formed as a part of the base 2. Specifically, when braking, the first end portion 31 receives a pulling force of the brake line 7 to move upward so that the first arm assembly 3 swings pivotally relative to the base 2, and the first abutting portion 34 pushes and abuts against the second abutting portion 43 and drives the second arm assembly 4 to swing so as to brake the bicycle synchronously and to reduce delay of brake. Preferably, the first arm assembly 3 is integrally formed, so the first arm assembly 3 has a strong structure. The first arm assembly 3 can interact with the second arm assembly 4 stably, transmit force directly and effectively, and the first arm assembly 3 can be assembled to other elements conveniently. More preferably, the first arm assembly 3 and the second arm assembly 4 are on a same plane; therefore, a space that the brake 1 for the bicycle occupies reduces, and a structural configuration of the bicycle is simple.

It is understandable that the second and fourth end portions 32, 42 are respectively provided with a restriction member 5, and the restriction members 5 are for contacting the first and second brake sides 81, 82 respectively; therefore, a user can change the restriction members 5 made of different materials to elevate a braking effect. In addition, each said restriction member 5 can be replaced after being used for a period of time, so the second and fourth end portions 32, 42 can be prevented from being abraded. It is to be noted that the brake 1 of the bicycle may further include an elastic member 6, and two ends of the elastic member 6 abut against the first and second arm assemblies 3, 4 respectively. The elastic member 6 allows the second and fourth end portions 32, 42 to move away from the wheel rim 8 automatically after braking so as to prevent the restriction members 5 from continuing contacting the first and second brake sides 81, 82.

In this embodiment, the first abutting portion 34 extends to be on a same plane with the first end portion 31, the first arm assembly 3 has a curved recess 33, and the second abutting portion 43 is arranged within the curved recess 33 to be interferable with the first abutting portion 34. Preferably, an upper interior face of the curved recess 33 has a restriction face 331, the second abutting portion 43 has an abutting face 431 facing the restriction face 331, and the restriction face 331 and the abutting face 431 are substantially complementary to each other in contour. During movement of the second and fourth end portions 32, 42 away from each other, the restriction face 331 and the abutting face 431 are abuttable against each other. In other words, when the braking action ends, the second and fourth end portions 32, 42 are restricted. The second and fourth end portions 32, 42 are urged by the elastic member 6 and are remote from the wheel rim 8 in a fixed distance, so the brake reaction time of each braking action is substantially the same. In addition, a distal end of the first abutting portion 34 has a first engaging portion 342, a distal end of the second abutting portion 43 has a second engaging portion 432 which restrictedly abuts against the first engaging portion 342 so as to make sure that the first and second abutting portions 34, 43 interact with each other in a fixed range. In other words, when the second and fourth end portions 32, 42 swing toward the wheel rim 8 overly, the first and second abutting portions 34, 43 can be prevented from being disengaged from each other. The first arm assembly 3 is rotatable about a first axis A1, and the second arm assembly 4 is rotatable about a second axis A2. The rigid main body 20 has an opening 23 configured for a fastener 24 to be disposed therethrough to rigidly fix the base 2 to the frame of the bicycle, the opening 23 extends in a direction parallel to the first axis A1 and the second axis A2, the base 2 further includes a projection 25 integrally extending from the rigid main body 20 and being outwardly protrusive beyond the first arm assembly 3 and the second arm assembly 4, the channeled portion 21 is disposed on the projection 25 and the through hole 22 is located out of the first arm assembly 3 and the second arm assembly 4, and the through hole 22 extends in a direction transverse to the first axis A1 and the second axis A2 and is directed toward the first end portion 31.

Figure 5:
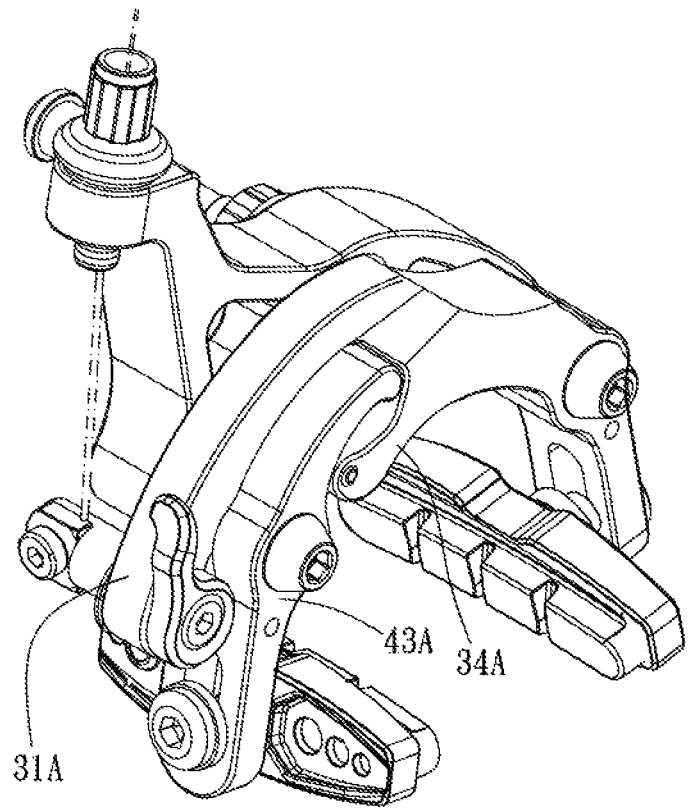
FIG. 5 is a perspective drawing of another preferred embodiment of the present invention.

However, the first abutting portion and the first end portion are not limited to the above-mentioned arrangement. The first abutting portion and the first end portion may be located on different planes and substantially in parallel. For example, in another embodiment as shown in FIG. 5, a first abutting portion 34A, a first end portion 31A and a second abutting portion 43A, the second abutting portion 43A partially overlaps with the first end portion 31A laterally, and the first abutting portion 34A laterally extends to abut against the second abutting portion 43A.

In addition, it is to be noted that the distal end of the first abutting portion 34 may be additionally provided with a rolling member 341 which rollably abuts against the second abutting portion 43 so as to reduce friction and to allow the first and second abutting portions 34, 43 to move synchronously and smoothly and to brake quickly. Preferably, the first and second abutting portions 34, 43 have the same thickness; therefore, when the first and second abutting portions 34, 43 interact with each other, forces can be distributed more evenly onto the first and second abutting portions 34, 43.

Given the above, in the brake of the bicycle, the first and second arm assemblies can be driven synchronously to swing toward and frictionally contact the wheel rim; therefore, the brake reaction time can be reduced, and each braking member will not be abraded on single side so as to provide preferable braking effect.

In addition, the first arm assembly is integrally formed; therefore, the first arm assembly has a strong structure and transmit forces more effectively, and the first arm assembly can be assembled to other elements quickly and conveniently.

Furthermore, the first arm assembly further has a curved recess so that the second abutting portion can extend thereinto to be interferable with the first abutting portion; therefore, a swinging range of the second abutting portion can be limited, and the first and the second arm assemblies are located on the same plane so that the brake of the bicycle has a simple structure. The distal ends of the first and second abutting portions are formed with engaging portions respectively to prevent disengagement of the first and second abutting portions when swinging overly.

Although particular embodiments of the invention have been described in detail for purposes of illustration, various modifications and enhancements may be made without departing from the spirit and scope of the invention. Accordingly, the invention is not to be limited except as by the appended claims.

What is claimed is:
1. A brake configured for being mounted to a bicycle, including:
  a base, including a rigid main body configured for being rigidly fixed to a frame of the bicycle, including a channeled portion fixedly connected with the rigid main body and having a through hole configured for a brake line to be slidably disposed therethrough, and the channeled portion being at a fixed position relative the rigid main body when the brake line is operated;

a first arm assembly, pivoted to the base and rotatable about a first axis, having a first end portion, a second end portion and a first abutting portion, the first end portion being for connection of the brake line which is disposed through the through hole of channeled portion, the second end portion being swingable toward a first brake side of a wheel rim to frictionally contact the first brake side;

a second arm assembly, pivoted to the base and corresponding to the first arm assembly, being rotatable about a second axis, having a third end portion, a fourth end portion and a second abutting portion arranged on the third end portion, the second abutting portion located correspondingly above the first abutting portion and interferable with the first abutting portion in a pivoting direction of the first abutting portion, the fourth end portion being swingable toward a second brake side of the wheel rim to frictionally contact the second brake side of the wheel rim;

wherein the rigid main body has an opening configured for a fastener to be disposed therethrough to rigidly fix the base to the frame of the bicycle, the opening extends in a direction parallel to the first axis and the second axis, the base further includes a projection integrally extending from the rigid main body and being outwardly protrusive beyond the first arm assembly and the second arm assembly, the channeled portion is disposed on the projection, and the through hole extends in a direction transverse to the first axis and the second axis and is directed toward the first end portion.

2. The brake for the bicycle of claim 1, wherein the first arm assembly has a curved recess, and the second abutting portion is arranged within the curved recess.

3. The brake for the bicycle of claim 2, wherein an upper interior face of the curved recess has a restriction face, the second abutting portion has an abutting face facing toward the restriction face, the restriction face and the abutting face are substantially complementary to each other in contour, and during movement of the second and fourth end portions away from each other, the restriction face and the abutting face are abutable against each other.

4. The brake for the bicycle of claim 1, wherein a distal end of the first abutting portion is provided with a rolling member which rollably abuts against the second abutting portion.

5. The brake for the bicycle of claim 1, wherein a distal end of the first abutting portion is formed with a first engaging portion, and a distal end of the second abutting portion is formed with a second engaging portion which restrictedly abuts against the first engaging portion.

6. The brake for the bicycle of claim 1, wherein the first atm assembly is integrally formed.

7. The brake for the bicycle of claim 6, wherein the first abutting portion and the first end portion are located on different planes and substantially in parallel.

8. The brake for the bicycle of claim 1, wherein the first arm assembly and the second arm assembly are located on a same plane.

9. The brake for the bicycle of claim 1, wherein the second and fourth end portions are respectively provided with a restriction member, and the restriction members are for contacting the first and second brake sides respectively.

10. The brake for the bicycle of claim 1, further including an elastic member, two ends of the elastic member abutting against the first arm assembly and the second arm assembly respectively.

11. The brake for the bicycle of claim 1, wherein the channeled portion is integrally formed as a part of the base.

* * * * *